June 16, 1931.  W. TIMSON  1,810,093

BALL BEARING MOUNTING

Filed Jan. 29, 1929

Inventor: William Timson
Per: George E. Folkes.
Attorney

Patented June 16, 1931

1,810,093

UNITED STATES PATENT OFFICE

WILLIAM TIMSON, OF BIRMINGHAM, ENGLAND, ASSIGNOR TO W. & T. AVERY LIMITED, OF SOHO FOUNDRY, BIRMINGHAM, ENGLAND

BALL BEARING MOUNTING

Application filed January 29, 1929, Serial No. 335,966, and in Great Britain February 8, 1928.

This invention has reference to improvements in or relating to ball bearing mountings for the shafts supporting the indicating mechanism of automatic or semi-automatic weighing apparatus.

In connection with ball bearing mountings for the shafts supporting the indicating mechanism of automatic or semi-automatic weighing apparatus, it has heretofore been the practice to mount the bearing balls in a carrier and to provide a race therefor in a surrounding removable annular bush and in a shoulder formed on the said shaft. This construction of ball bearing mounting is, however, open to the objections that the lines joining the points of contact of the balls with the adjacent surfaces are not disposed parallel to the axis of rotation and that there is a tendency during the rapid rotation of the shaft for the bearing balls and the shaft to rotate at different velocities whereby a dragging effect is exerted on the shaft by the slower moving balls which affects the accuracy of indication.

The present invention has for its object the provision of an improved ball bearing mounting for the shafts supporting the indicating mechanism of weighing apparatus which is simple in construction and wherein the aforesaid disadvantages are eliminated.

The invention consists of an improved ball bearing mounting for the shafts of weighing apparatus wherein bearing balls are freely disposed within a race constituted by a removable annular bush member, the adjacent surface of a shoulder formed on the shaft or of a loosely mounted annular washer adapted to be disposed concentrically about the shaft and to abut a shoulder thereon and a bearing surface formed on the said shaft, the race for the bearing balls constituted by the said bush, shoulder or annular washer and the periphery of the shaft being so disposed and of such dimensions that the balls simultaneously contact with the bush member, shoulder or annular washer and shaft at diametrically opposed points the lines joining which are either parallel to or at right angles to the axis of rotation of the shaft.

The invention will now be described with particular reference to the accompanying sheet of drawings, wherein.

Figure 1:
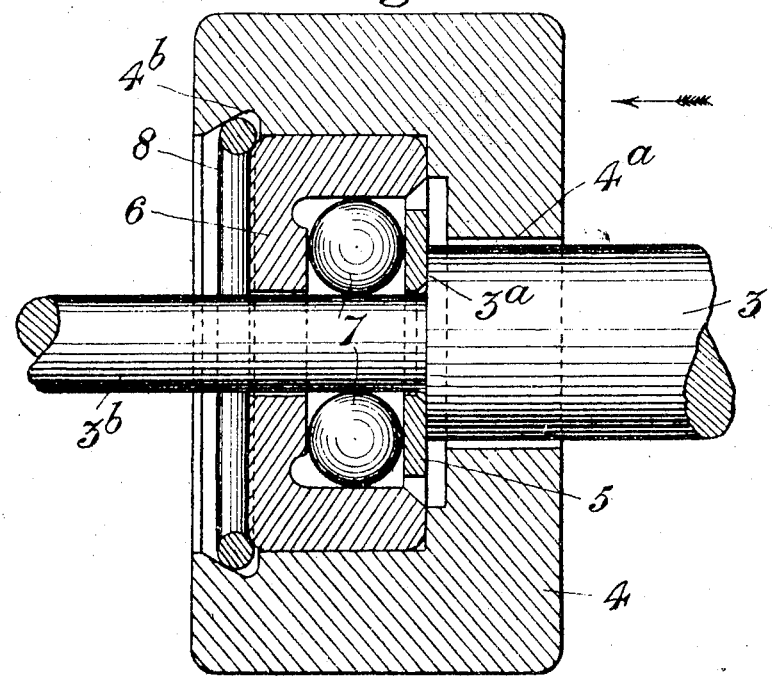
Figure 1 is a view partly in section and partly in elevation of a portion of the shaft for carrying an automatic weight indicating mechanism supported in a ball bearing mounting constructed in accordance with the invention.
Figure 2:
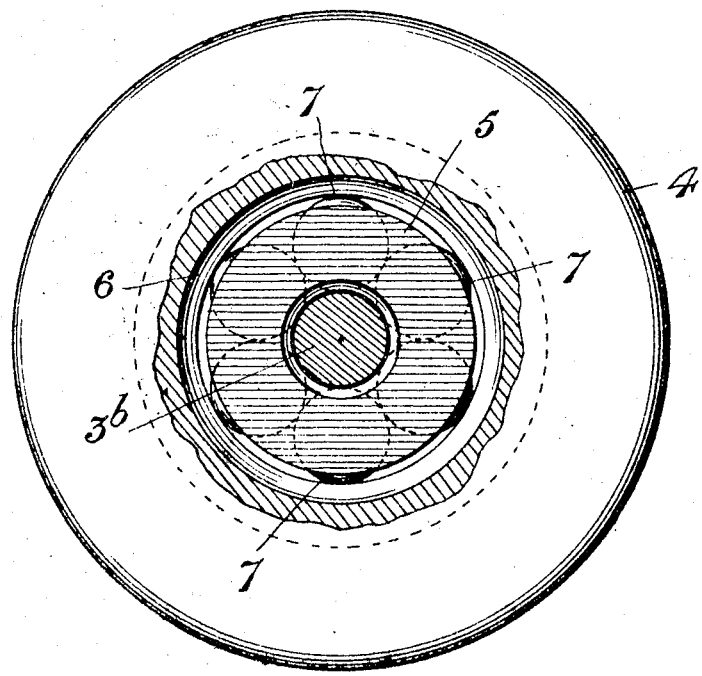
Figure 2 is a part sectional end elevation of the mounting and portion of the shaft seen in Figure 1 looking in the direction of the arrow in the said figure.

The indicating shaft 3 carrying an automatic weight indicating mechanism of known kind is adapted to project within an aperture formed within an inwardly directed flange $4^a$ formed at the inner end of an annular body member 4 adapted to be secured within the housing containing the indicating mechanism. The shaft 3 is provided with a slight shoulder $3^a$ adapted to constitute an abutment for an annular washer 5 which is disposed within the annular body member 4 and located intermediate the outer face of the said inwardly directed flange $4^a$ and an annular bush 6 disposed within the outer section of the annular body member 4. The washer 5 is of such a diameter that it prevents the dislodgment of the bearing balls 7 from the race but at the same time permits of the movement of the washer within the body member 4 so as to allow of the passage of the end of the shaft 3 through the aperture in the annular member 4 during the assembly of the indicating mechanism.

The bearing balls 7 are disposed between the inner faces of the annular bush 6 and the outer face of the washer 5 the said balls also having a bearing surface on the periphery of the reduced portion $3^b$ of the indicating shaft.

The annular bush 6 is maintained within the body member 4 by means of a resilient spring washer 8 which engages within an undercut groove $4^b$ formed in the inner wall of the said member adjacent the outer end thereof.

It will be appreciated that the thrust on the shaft 3 maintains the annular washer 5 in frictional contact with the shoulder $3^a$ on the shaft whereby the said washer rotates with the shaft and serves the same purpose as a shoulder thereon. In addition, the provision within the body member 4 of the loosely mounted washer 5 permits of the ready assembly of the ball bearing mounting as a whole.

In the modification the washer 5 may be dispensed with and the shoulder 3ª on the shaft 3 made of a depth to constitute a bearing surface for the contiguous portions of the bearing balls 7, the construction embodying the annular washer however is to be preferred as it enables a lighter shaft to be employed and further it facilitates the initial assembly of the bearing.

What I claim is:—

1. A ball bearing mounting for the shafts of weighing apparatus comprising a cup-shaped annular body member the open end whereof is outwardly disposed, an aperture in the closed end of the said member through which the shaft is adapted to pass, a cup-shaped bush member adapted to fit within the annular body member, the closed end of the said bush member being outwardly disposed, a hole in the closed end of the bush member permitting of the passage of the shaft therethrough, an abutment carried by the shaft and which is oppositely disposed relatively to the inner face of the bush member and a plurality of bearing balls adapted to be disposed concentrically about the shaft said balls being of a diameter such that the peripheries thereof contact simultaneously with the bush member, abutment and shaft at diametrically opposed points the lines joining which are either parallel to or at right angles to the axis of rotation of the shaft.

2. A ball bearing mounting for the shafts of weighing apparatus comprising a cup-shaped annular body member adapted to be secured to a relatively fixed portion of the weighing apparatus within the open end of the said member outwardly disposed, an aperture in the said cup member for the passage through the said member of the shaft, a cup-shaped annular bush member adapted to fit within the said annular member and with the closed end of the bush member outwardly directed, a shoulder on the shaft constituting an abutment, a reduced portion on the shaft, an aperture in the closed end of the bush member adapted to receive the reduced portion of the shaft, bearing balls located within the annular bush member so that the balls simultaneously contact with the annular bush member the periphery of the reduced portion of the shaft and the adjacent surfaces of the abutment on the shaft at points the lines joining which are either parallel to or at right angles to the axis of rotation of the shaft and means for maintaining the annular bush member within the annular body member.

3. A ball bearing mounting for the shafts of weighing apparatus comprising a cup-shaped annular body member provided with a projecting flange and adapted to be secured to a relatively fixed portion of the weighing apparatus with the open end of the said body member outwardly disposed, an aperture in the said body member for the passage through the said member of the shaft, a cup-shaped annular bush member adapted to fit within the annular body and having the closed end thereof outwardly directed, a shoulder on the shaft constituting an abutment, a washer loosely mounted relatively to the annular body member and disposed within the open end of the said member and adapted to be concentrically mounted upon the shaft and to abut the shoulder thereon, an aperture in the closed end of the annular bush member, a reduced portion of the shaft adapted to pass through the said aperture, bearing balls located within the annular bush member so that the balls contact simultaneously with the annular bush member, the periphery of the reduced portion of the shaft and adjacent surfaces of the annular member at points the lines joining which are either parallel to or at right angles to the axis of rotation of the shaft and means for maintaining the annular bush member within the annular body member.

In testimony whereof, I have signed my name to this specification.

WILLIAM TIMSON.